April 28, 1970     A. P. WARREN ET AL     3,508,723
METHOD AND APPARATUS FOR SECURING TO A SPACECRAFT
Filed Dec. 26, 1967     3 Sheets—Sheet 1

ALFRED P. WARREN
WILLIAM R. LAUDERDALE
INVENTOR.(S)

ATTORNEYS

ALFRED P. WARREN
WILLIAM R. LAUDERDALE
INVENTOR(S)

ATTORNEYS

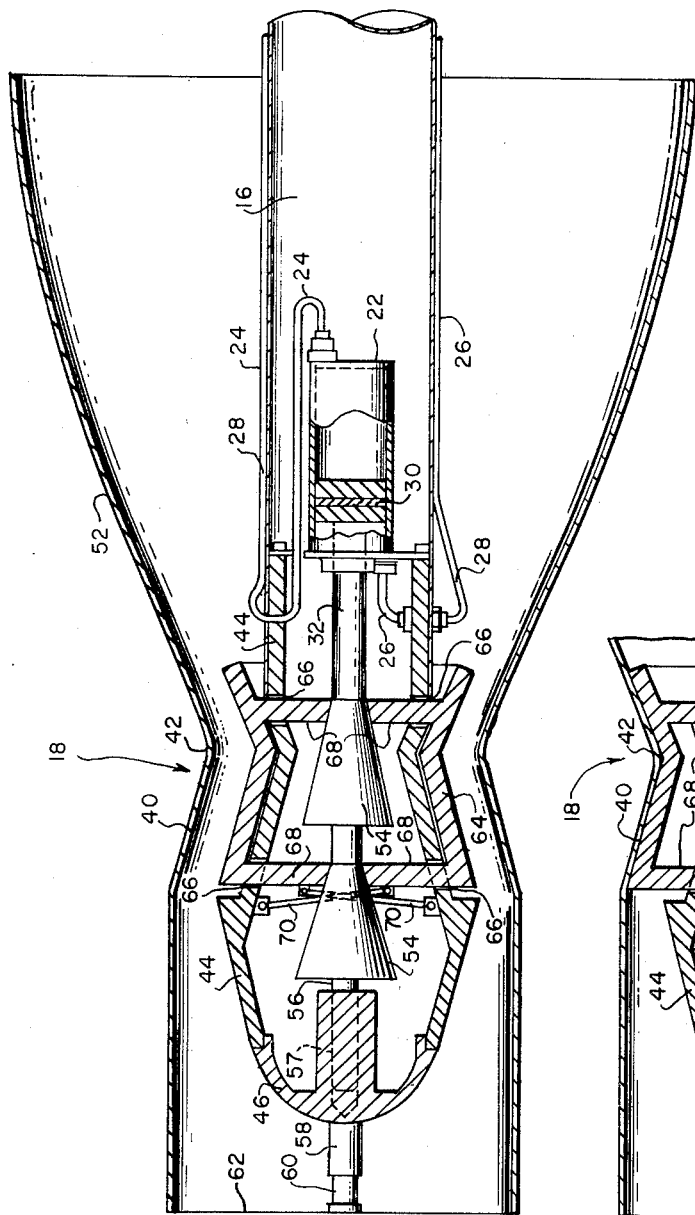
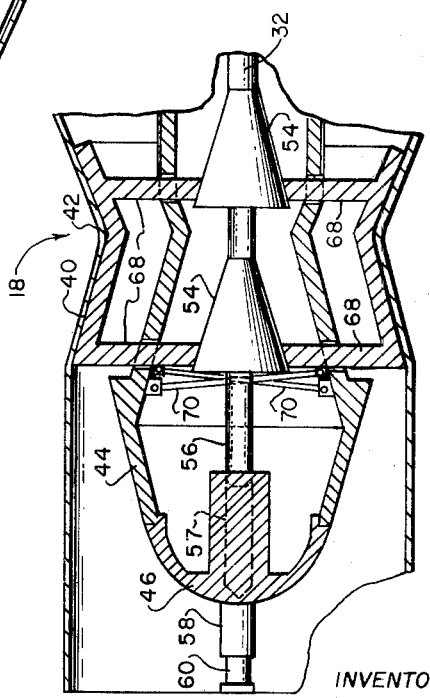
INVENTOR(S)
ALFRED P WARREN
WILLIAM R. LAUDERDALE
ATTORNEYS

United States Patent Office 3,508,723
Patented Apr. 28, 1970

3,508,723
METHOD AND APPARATUS FOR SECURING TO A SPACECRAFT
Alfred P. Warren and William R. Lauderdale, Huntsville, Ala., assignors to the United States of America as represented by the Administrator of the National Aeronautics and Space Administration
Filed Dec. 26, 1967, Ser. No. 693,419
Int. Cl. B64g 1/20; B64d 39/00
U.S. Cl. 244—1                   15 Claims

ABSTRACT OF THE DISCLOSURE

A method and apparatus for connecting two spacecraft together by inserting a probe on one spacecraft into the rocket engine nozzle of the other spacecraft and expanding the device laterally in order to secure directly to the nozzle of the rocket engine. The apparatus utilizes a probe having power driven locking shoes mounted on it. The locking shoes are arranged to be retracted while the probe is being inserted into the nozzle. The shoes may then be expanded laterally by gas or hydraulic pressure to lock to the throat of the nozzle. Two embodiments of the device are disclosed, one designed to fit a particular size and type of rocket engine and the other designed as a universal type securing device which will fit a variety of types and sizes of rocket engines.

BACKGROUND OF THE INVENTION

The invention described herein was made by employees of the United States Government and may be manufactured and used by or for the Government for governmental purposes without the payment of any royalties thereon or therefor.

Field of the invention

This invention relates to the docking of spacecraft and more particularly to a method and apparatus for securing one space vehicle to another while such vehicles are in flight in space.

Description of the prior art

Rendezvousing and docking of space vehicles constitutes an essential and critical factor in future space operations and exploration. There will, of course, be a requirement to permanently or semi-permanently attach space vehicles together in order to establish larger modular space vehicles or space laboratories. In addition, there is also a necessity for securing one space vehicle to another space vehicle for the purpose of moving one vehicle out of orbit or transporting one vehicle to a remote location by use of the engine on the second vehicle. This technique would be particularly useful whenever it is necessary to use one spacecraft to secure another spacecraft which is disabled.

The present method of securing one spacecraft to another spacecraft or to a space module requires that each of the two spacecraft involved in the docking procedure be equipped with a securing structure which is compatible for use with the structure on the other spacecraft. These structures typically take the form of compatible male and female devices, such as a docking adapter which mates with a special docking collar. The docking adapter and special docking collar are used only for the docking maneuver.

These docking devices which are presently in use have been successful for primary docking missions. However, this general class of devices is presently the only type of devices used for securing one spacecraft to another spacecraft. Without these heavy and expensive adapters and docking collars positioned on both spacecraft, no docking is possible. This need for compatible devices on both spacecraft to be docked seriously limits the flexibility in docking various types of spacecraft. For example, using existing devices, it is not possible to secure to a spacecraft which is not equipped with a securing device. Furthermore, two spacecraft may each be equipped with securing devices but they may not be able to dock because their devices are of incompatible designs or sizes.

SUMMARY OF THE INVENTION

Accordingly it is a general object of this invention to provide an improved method and apparatus for securing to a spacecraft.

It is a further object of the invention to provide a method and apparatus for securing to a spacecraft which allows a first spacecraft to dock with a second spacecraft which is not equipped with a compatible securing device.

It is a still further object of the invention to provide a method and apparatus for securing to a spacecraft which allows a first spacecraft to dock with a second spacecraft which has no docking device installed, by securing directly to the rocket engine nozzle of the second spaceraft.

These and other objects are accomplished in the present invention which includes a method of securing a first spacecraft directly to the rocket engine nozzle of a second spacecraft. After a securing device attached to the first spacecraft is inserted into the rocket engine nozzle of the second spacecraft, the securing device is expanded laterally to lock the device to the inside of the nozzle. The securing device and its alternative embodiment disclosed herein both comprise a probe for insertion into the rocket engine nozzle, shoes for moving outwardly and locking against the inside of the nozzle, and means for causing the shoes to move outwardly.

BRIEF DESCRIPTION OF THE DRAWINGS

The invention will be more fully understood when taken together with the accompanying drawings in which:

FIGURE 6 is a vertical sectional view of an alternative device for securing one spacecraft to another spacecraft, with the securing device unlatched.

FIGURE 7 is a vertical sectional view of the securing device of FIGURE 6 in the latched position.

DESCRIPTION OF THE PREFERRED EMBODIMENTS

Figure 1:
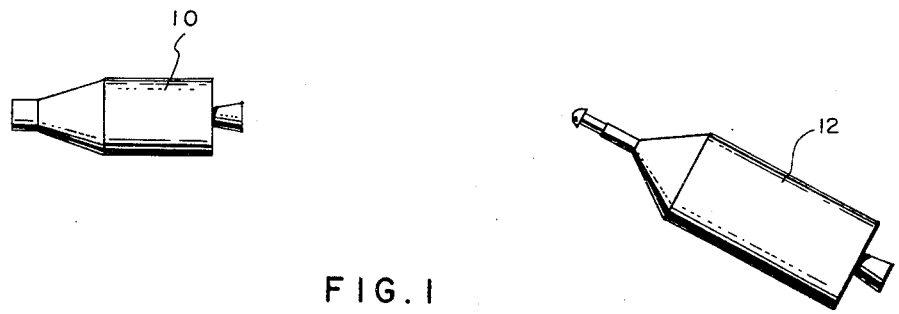
FIGURE 1 is a side elevation showing two spacecraft in flight, with one spacecraft approaching the other spacecraft from the rear, for the purpose of docking.
Figure 2:
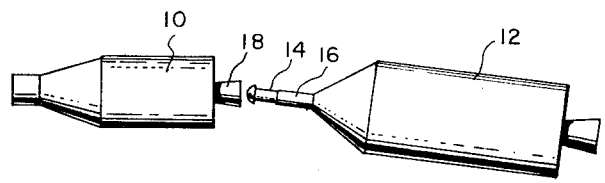
FIGURE 2 is a side elevation showing the two spacecraft of FIGURE 1, with the rearmost spacecraft inserting its securing device into the rocket engine nozzle of the forward spacecraft.
Figure 3:
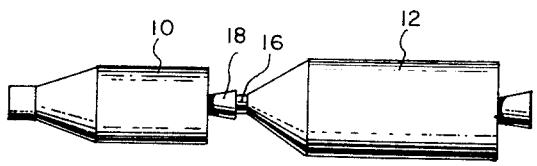
FIGURE 3 is a side elevation showing the two spacecraft of FIGURES 1 and 2 after they have docked and are secured together.
Figure 4:
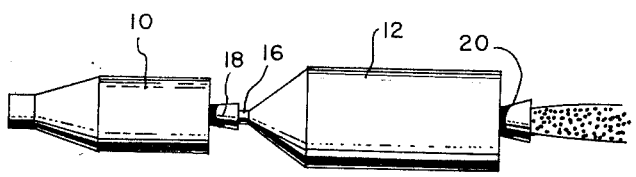
FIGURE 4 is a side elevation showing the two spacecraft of FIGURES 1 through 3 secured together and traveling.

With continued reference to the accompanying figures, and with initial attention directed to FIGURES 1 through 4, wherein like reference numerals designate similar parts throughout the various views, there is illustrated a typical use of the present invention in the securing of a disabled spacecraft 10 by an active spacecraft 12. In FIGURE 1, active spacecraft 12 approaches disabled spacecraft 10 from the rear. In FIGURE 2, active spacecraft 12 inserts its securing device 14 mounted on boom 16 into the rocket engine nozzle 18 of disabled spacecraft 10. In FIGURE 3, securing device 14 has been inserted into the rocket engine nozzle 18 of disabled spacecraft 10 and expanded laterally so as to firmly secure spacecrafts 10 and 12 together. In FIGURE 4, rocket engine 20 of active spacecraft 12 has been started and secured (docked) and spacecract 10 and 12 are traveling together to move out of orbit or to a remote location.

Figure 5:
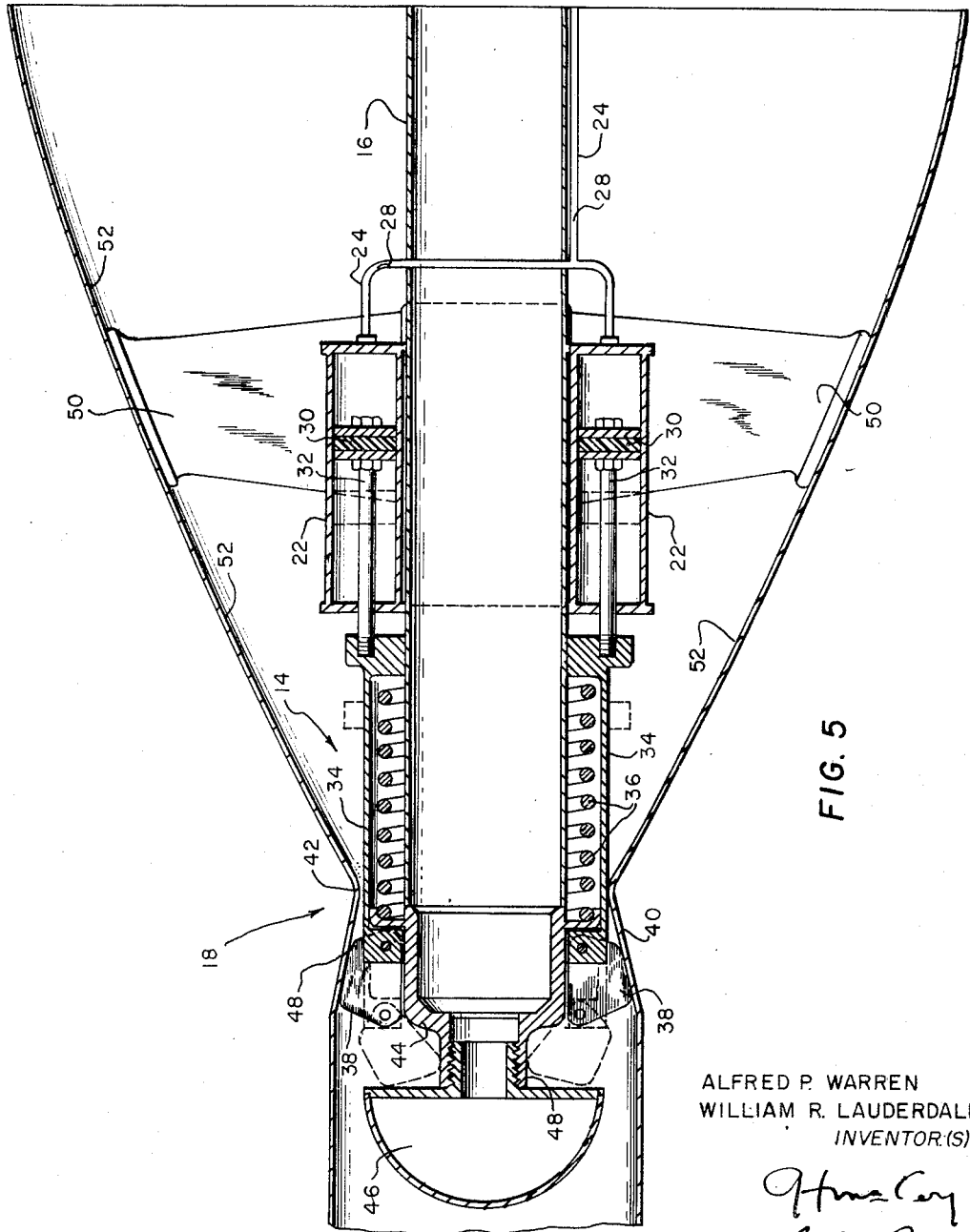
FIGURE 5 is a vertical sectional view of the device for use in securing one spacecraft to another spacecraft.

In FIGURE 5 is shown a securing device designated generally by numeral 14 which is designed to fit a nozzle 18 of a particular type of rocket engine. The securing device 14 is mounted on the end of a boom 16 which is fastened to a rescue spacecraft (not shown). Gas or compressed air cylinders 22 are mounted on opposite sides of the boom 16. Attached to cylinders 22 are gas lines 24. Lines 24 contain gas or compressed air 28.

Cylinders 22 contain pistons 30 which are connected to piston rods 32. Piston rods 32 are in turn connected to a spring loaded collar 34, which encloses spring 36. Both spring 36 and its collar 34 surrounds and encloses a portion of the boom 16. Spring collar 32 is arranged to slide along the outer surface of boom 16 in response to movements of piston 30 and piston rod 32. Locking shoes 38 are pivotally attached to the end of spring loaded collar 34 so that the locking shoes 38 may be pivoted outward to lock against the convergent section 40 of the nozzle 18, thus locking the securing device 14 within the inside of the throat 42. Attached to the outer end of boom 16 is end fitting 44 which is fastened to hemispherical tip 46. End fitting 44 and tip 46 form an annular groove 48. The bottom and side of groove 48 are used to cam locking shoes 38 into and out of the locked position. Conical support collar 50 bears against divergent section 52 of the nozzle 18, in order to prevent lateral movement of the boom 16 and its securing device 14.

The securing device 14 (see FIGURE 5) operates as follows: prior to insertion of the securing device 14 into the nozzle 18 of the disabled spacecraft, the gas or compressed air 28 is fed into the tubing or gas lines 24. The gas 28 pressurizes cylinders 22 and moves pistons 30 to the left. Piston rods 32 move spring loaded collar 34 forward, allowing locking shoes 38 to drop into annular groove 48. Spring 36 holds the locking shoes 38 in the groove 48 in retracted position.

The securing device 14 is then inserted into the rocket nozzle 18. With locking shoes 36 in the retracted position, the forward part of securing device 14 passes through the throat 42 of the rocket engine nozzle 18. The pressure of gas 28 in gas lines 24 is then relieved, allowing spring 36 to slide the spring loaded collar 34 and pistons 30 to the rear, thus camming locking shoes 38 outwardly into the locked position. Locking shoes 38 are then wedged between end fitting 44 and convergent section 40 of rocket engine nozzle 18, thus locking the securing device 14 and securely connecting the two spacecraft together. Conical support collar 50 bears against divergent section 52 to hold boom 16 in position and thus stabilize the connection.

FIGURES 6 and 7 show an alternative embodiment of the invention, a universal device for securing to a spacecraft. Looking first at FIGURE 6, there is shown a securing device, designated generally by numeral 14. Securing device 14 is dsigned to fit a nozzle 18 of a universal type of rocket engine on a disabled spacecraft (not shown). Securing device 14 is mounted on the end of a boom 16 which is fastened to a rescue spacecraft (not shown). Hydraulic cylinder 22 is mounted inside the boom 16. Attached to cylinder 22 are tubing or hydraulic lines 24 and 26, which contain hydraulic fluid 28. Cylinder 22 contains piston 30 which is connected to piston rod 32. Hydraulic line 24 provides pressure in cylinder 22 to drive piston 30 forward, while hydraulic line 26 provides back pressure in cylinder 22 to drive piston 30 backward. Piston rod 32 has cones 54 mounted on it. The end of piston rod 32 has a guide portion 56 which is arranged to slide back and forth in a hole 57 tapped out of the probe tip 46 of the boom 16. Tip 46 is fastened to end fitting 44 which is in turn fastened to the end of the boom 16. Mounted on the end of probe tip 46 is a probe stop 58 with an attached adjustable point 60. Point 60 may be adjusted to fit the injector or rear wall 62 of the combustion chamber of the particular type of rocket engine present in the disabled spacecraft. A pair of bearing shoes 64 are mounted opposite each other on end fitting 44 so that bearing shoes 64 may be forced outward to grip the nozzle 18. Bearing shoes 64 are configured with a converging section and a diverging section, which enables them to grip nozzle 18 tightly at its throat position 42 and thus effect a tight and positive lock. End fitting 44 has two holes 66 at both the top and bottom portions. These holes 66 receive two guides 68 on each of the two bearing shoes 64. A pair of crossed springs 70 hold bearing shoes 64 in the normally retracted (unlatched) position as shown in FIGURE 6. Bearing shoes 64 can be forced outwardly by cones 54 so as to assume the extended (latched) position as shown in FIGURE 7.

The securing device 14 shown in FIGURES 6 and 7 operates as follows: prior to insertion of the securing device 14 into the nozzle 18 of the disabled spacecraft, the hydraulic fluid 28 is fed into the hydraulic lines 24. The hydraulic fluid 28 pressurizes cylinder 22 and moves piston 30 to the left. Piston rod 32 moves cones 54 to the left, taking the lateral pressure off the bearing shoes 64 and allowing spring 70 to retract the bearing shoes 64.

With adjustable probe stop point 60 set for the specific type of rocket engine in the disabled spacecraft, the securing device 14 is inserted into the rocket nozzle 18. With bearing shoes 64 in the retracted position, the forward part of securing device 14 passes through the throat 42 of the rocket engine nozzle 18. When the probe stop point 60 contacts the engine injector 62, the securing boom 16 is in position to deploy the securing device 14. Hydraulic fluid 28 is pumped through line 26, causing a back pressure buildup on piston 30. Piston 30 moves backward, also moving piston rod 32 and cones 54 backward. Guides 68 ride the inclined surface of cones 54 as cones 54 move backward. Guides 68 and bearing shoes 64 are forced outward. As the hydraulic fluid pressure reaches its predetermined level, bearing shoes 64 center on the throat 42 of the nozzle 18, thus latching the securing device 14 and securely connecting the two spacecraft together.

To release the securing device 14, hydraulic fluid is pumped through line 24 and bled through line 26. Then the piston 30 moves forward and bearing shoes 64 are returned to the retracted position by springs 70.

From the foregoing it may be seen that applicant has invented both a novel method of securing to a spacecraft and novel apparatus for carrying out the method. The invention is a method of connecting directly to the rocket engine nozzle of a disabled spacecraft, in order to retrieve the disabled spacecraft by an active spacecraft. By the use of this method, the disabled spacecraft does not need a special female docking attachment or any other type of equipment pre-installation. The apparatus disclosed is a novel arrangement of a securing device having a pair of power driven locking shoes. The shoes may be retracted for insertion into a particular type of rocket engine nozzle of a disabled spacecraft and then be cammed outward to lock against the converging section of the rocket engine nozzle, thus locking the spacecraft together. An alternative arrangement of the apparatus is a universal type securing device which can be used to secure disabled spacecraft having various sizes of rocket engine nozzles. Thus, this device can be used to connect to and secure almost any disabled spacecraft. Although the method and apparatus described above have been disclosed in terms of securing a disabled spacecraft, it will be obvious to one skilled in the art that almost any spacecraft or rocket, disabled or not, may be secured by the method and apparatus of the present invention, if the engine of the secured spacecraft or rocket is shut off. The invention may also be useful in securing satellites, particularly those of historical significance, if they are equipped with a rocket engine.

Obviously, numerous modifications and variations of the present invention are possible in the light of the above teachings. It is therefore to be understood that the invention may be practiced otherwise than is specifically prescribed.

What is claimed is:

1. The method of securing an active spacecraft to a disabled spacecraft and recovering the disabled spacecraft in planetary orbit comprising the steps of:
    (a) approaching the disabled spacecraft from the rear,
    (b) inserting a securing device connected to the active spacecraft directly into the nozzle of the rocket engine of the disabled spacecraft,
    (c) expanding the securing device laterally outward to secure the mechanism to the tapered inside surface of the throat of the nozzle.

2. The method of securing an active spacecraft to a disabled spacecraft and recovering the disabled spacecraft in planetary orbit of claim 1 including the further step of moving the disabled spacecraft to a distant point under power from the engine of the active spacecraft.

3. The method of securing an active spacecraft to a disabled spacecraft and recovering the disabled spacecraft in planetary orbit of claim 2 including the further step of reducing the thrust of the active spacecraft engine in order to bring the two spacecraft out of orbit.

4. A space vehicle securing device comprising:
    (a) a boom, for attachment to one space vehicle,
    (b) locking means comprising a pair of locking shoes mounted on said boom, said locking means being adapted to move outwardly and lock directly to the rocket engine nozzle of a second space vehicle,
    (c) power cylinder means connected to said locking means for moving said locking means outwardly.

5. The space vehicle securing device as set forth in claim 4 wherein said power cylinder means further comprises a pair of cylinders mounted on said boom, each said cylinder containing a piston with an attached piston rod.

6. The space vehicle securing device as set forth in claim 5 wherein said means for moving said locking shoes further comprises a spring collar attached to said piston rods, said spring collar enclosing a portion of said boom.

7. The space vehicle securing device as set forth in claim 6 further comprising a spring enclosed in said spring collar.

8. The space vehicle securing device as set forth in claim 7 wherein said locking shoes are pivotally attached to the end of said spring collar most remote from said piston rod.

9. The space vehicle securing device as set forth in claim 8 wherein said boom further comprises an end fitting and a tip attached to said end fitting, said end fitting and tip being arranged to form an annular ring for camming said locking shoes into and out of their outward position.

10. The space vehicle securing device as set forth in claim 9 further comprising a conical support collar attached to said boom for preventing lateral movement of the said boom.

11. The space vehicle securing device as set forth in claim 4 wherein said power cylinder means comprises a cylinder mounted inside the end of said boom, said cylinder containing a piston with an attached piston rod.

12. The space vehicle securing device as set forth in claim 11 further comprising:
    (a) an end fitting attached to said boom, said end fitting having a pair of guide holes cut in its top surface and a second pair of guide holes cut in its bottom surface,
    (b) a boom tip attached to said end fitting, said boom tip containing a tapped hole at the center of its inside surface,
    (c) a probe stop attached to said tip,
    (d) an adjustable point attached to said probe stop, for contacting the engine injector of the second spacecraft and thereby limiting the forward travel of the boom.

13. The space vehicle securing device as set forth in claim 12 further comprising a pair of tapered cones mounted on said piston rod for camming said locking shoes outward.

14. The space vehicle securing device as set forth in claim 13 wherein the end of said piston rod remote from said piston is a guide arranged to slide back and forth in said tapped hole in said boom tip.

15. The space vehicle securing device as set forth in claim 14 wherein said locking shoes are mounted on said end fitting and each of said locking shoes has a pair of attached guides, said guides being arranged to be slidably received in said guide holes in said end fitting, whereby said locking shoes are cammed outwardly when said cones are retracted so as to exert pressure against said guides.

References Cited

UNITED STATES PATENTS

| | | | |
|---|---|---|---|
| 2,804,823 | 9/1957 | Jablansky | 102—49.4 |
| 3,201,065 | 8/1965 | Dunn | 244—1 |
| 3,268,091 | 8/1966 | Melton | 244—1 X |
| 3,389,877 | 6/1968 | Huber et al. | 244—1 |
| 3,401,903 | 9/1968 | Behr | 244—1 |

MILTON BUCHLER, Primary Examiner

J. L. FORMAN, Assistant Examiner

U.S. Cl. X.R.

102—49.4; 244—3, 135